United States Patent [19]

Wahlert

[11] 3,856,665

[45] Dec. 24, 1974

[54] METHOD OF SEGREGATING ARTICLES BEING CONVEYED

[75] Inventor: Stanley D. Wahlert, Westchester, Ohio

[73] Assignee: The Procter & Gamble Company, Cincinnati, Ohio

[22] Filed: July 30, 1973

[21] Appl. No.: 383,926

[52] U.S. Cl. .................................. 209/73, 209/74
[51] Int. Cl. ...................................... B07c
[58] Field of Search ......... 209/73, 74 R, 90, 91, 82, 209/121; 198/31 R, 33 AA

[56] References Cited
UNITED STATES PATENTS

| | | | |
|---|---|---|---|
| 1,551,614 | 9/1923 | Paridon | 198/31 R |
| 2,560,737 | 7/1951 | Palmer, Jr. | 209/90 UX |
| 3,073,444 | 1/1963 | Bielinski, et al. | 209/74 R |
| 3,409,128 | 11/1968 | Hutaff | 209/90 X |
| 3,471,012 | 10/1969 | Calhoun | 209/74 K |

*Primary Examiner*—Allen N. Knowles
*Attorney, Agent, or Firm*—Thomas J. Slone; John V. Gorman; Richard C. Witte

[57] ABSTRACT

A method of segregating articles being conveyed in a file by: conveying the articles on a first conveyor having a portion thereof in side-by-side relation with a portion of a second conveyor; inspecting and identifying, in accordance with predetermined parametric criteria such as dynamic response, each article to be acceptable or unacceptable; and, acting to transfer each acceptable article to the second conveyor whereby the acceptable articles form a sub-file on the second conveyor while the unacceptable articles remain, as another sub-file, on the first conveyor. In this manner, the means for acting to transfer acceptably uniform articles from one conveyor to another can be optimized to act uniformly on acceptable acticles, having substantially uniform dynamic response characteristics, rather than having to act on unacceptable articles having variable dynamic response, for example, due to variable non-uniform filling density or level.

2 Claims, 6 Drawing Figures

PATENTED DEC 24 1974 3,856,665
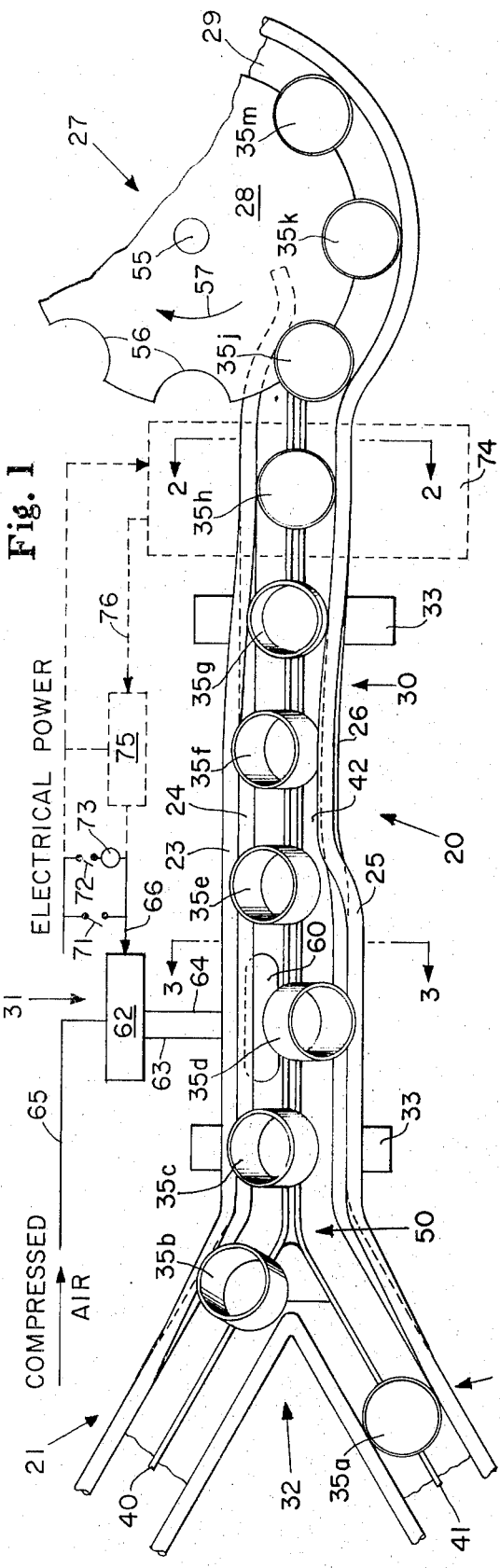
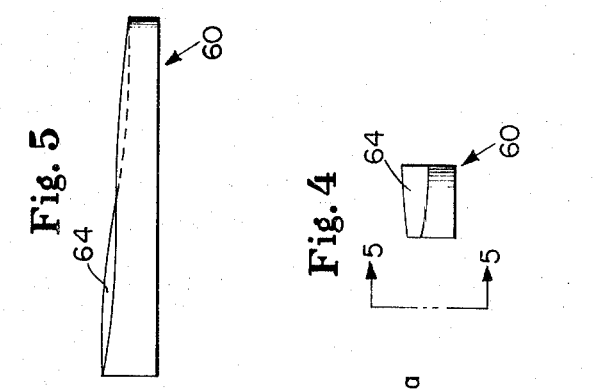
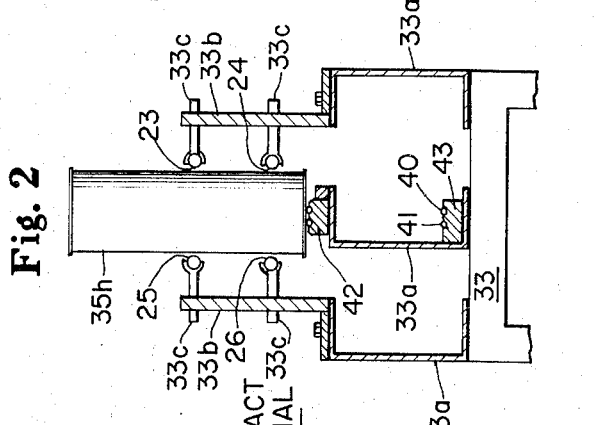
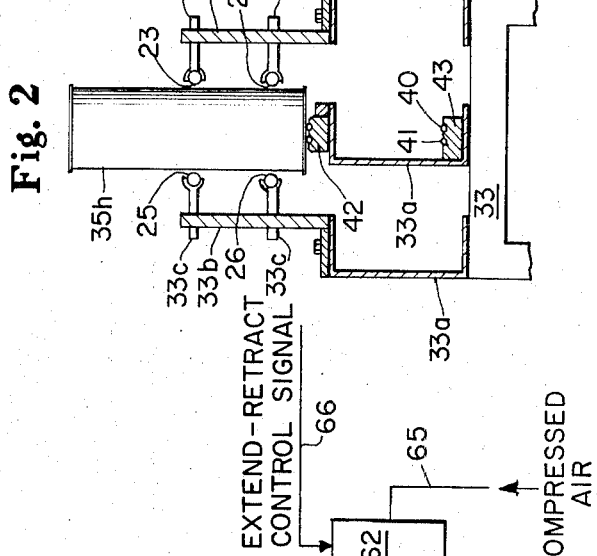
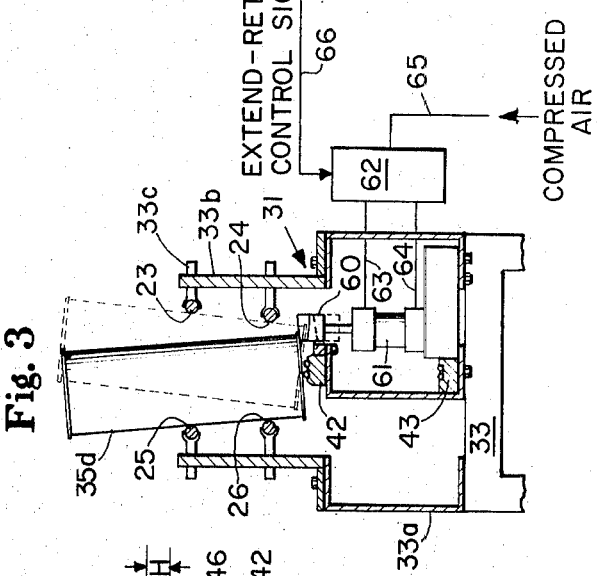
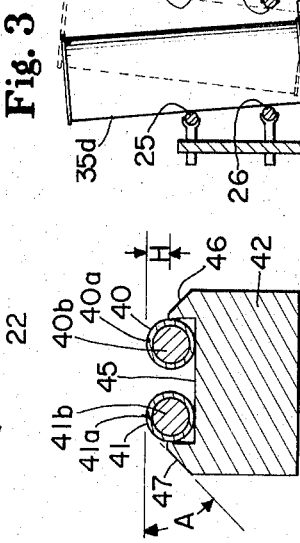

METHOD OF SEGREGATING ARTICLES BEING CONVEYED

CROSS REFERENCE TO RELATED APPLICATIONS

This application is related to the commonly assigned and concurrently filed application of Stanley D. Wahlert entitled "Article Segregating Apparatus," filed July 30, 1973, Ser. No. 383,927.

FIELD OF THE INVENTION

This invention relates generally to methods of segregating into sub-files an incoming file of conveyed articles such as tubular cans in accordance with predetermined parametric criteria such as dynamic response characteristics. As the term is used herein, a method of segregating is a method of separating acceptable "good" articles from unacceptable "bad" articles.

BACKGROUND OF THE INVENTION

Methods of segregating conveyed articles are commonly practiced with apparatus which diverts unacceptable articles and which permit the free passage of acceptable articles in accordance with predetermined parametric criteria. Such apparatus commonly employs some fixed-characteristic diverting means such as a kicker, pusher, or camming device to divert, as by sliding transversely on a conveyor belt, unacceptable articles from the path of acceptable articles which are simply conveyed therethrough. Such apparatus may also include means for conveying the diverted articles therefrom.

However, whenever acceptable articles are such articles that have dynamic response characteristics within an acceptable range and unacceptable articles have dynamic response characteristics outside of the acceptable range, the action of fixed-characteristic diverter means on unacceptable articles results in a range of article responses rather than substantially uniform article responses. Such a range of responses may include bouncing, rebounding, tumbling and the like and/or may deleteriously affect the articles themselves.

Segregating apparatus prior art includes U.S. Pat. No. 3,033,629 issued Oct. 10, 1961 to Albert Luther Henderson which discloses apparatus which includes a camming type diverter which can be positioned to transversely displace selected articles on a conveyor belt so that selected articles form a sub-file and articles which have not been diverted form a second sub-file. Both sub-files are then forwarded on a two-file-wide conveyor belt. Another prior art type of segregating apparatus is disclosed in U.S. Pat. No. 3,472,506, issued Oct. 14, 1969 to Jacob Rabinow et al., which apparatus includes a controllable rotary diverter disposed between divergent portions of two conveyors downstream from a Y-shape juncture of the two conveyors. It has, however, been determined that the presence of an active, controllable member such as a rotary diverter at a point of divergence between conveyors is undesirable because such a downstream member may be difficult to control to achieve article-by-article segregation. Such a juncture-disposed member also unduly congests an already complex area of conveying equipment. With respect to specific types of conveyors, the prior art includes U.S. Pat. No. 3,507,380, issued Apr. 21, 1970 to Steve Sarovich et al., and U.S. Pat. No. 1,226,592, issued May 15, 1917 to Henry Claude Privett which patents both disclose cable-type conveyors. None of the discovered prior art has, however, solved the problems associated with segregating an incoming file of articles in accordance with predetermined parametric criteria such as dynamic response characteristics in the manner nor to the degree of the instant invention.

SUMMARY OF THE INVENTION

The nature and substance of the present invention will be more readily appreciated after giving consideration to its major aims and purposes. Principle objects of the invention are recited in the ensuing paragraphs in order to provide a better appreciation of its important aspects prior to describing the details of the preferred embodiment in later portions of this description.

A major object of the invention is providing a method for segregating conveyed articles which method effects segregation through acting on selected, substantially uniform, acceptable articles to transfer them from a first conveyor to an adjacent second conveyor while permitting unacceptable articles to be forwarded on the first conveyor.

Another major object of the invention is providing a method for segregating a conveyed file of articles into two sub-files of articles in accordance with predetermined parametric criteria which method includes the steps of causing each article to be disposed at a stable, first predetermined orientation and subsequently selectively causing substantially uniform, acceptable articles to be diverted and disposed at a stable, second predetermined orientation.

Yet another object of the invention is providing a method for segregating tubular articles being conveyed on side-by-side portions of cable-type conveyors which method includes the steps of causing each article to have a stable orientation such that it is propelled by only one cable conveyor, and subsequently selectively causing substantially uniform, acceptable articles to have a second orientation such that the selected articles are propelled by only the second cable conveyor and the non-uniform, unacceptable articles are forwarded on the one conveyor.

These and other objects are achieved by providing a method for segregating a conveyed file of articles into a first sub-file consisting of unacceptable articles having dynamic response characteristics outside an acceptable range, and a second sub-file consisting of acceptable articles having dynamic response characteristics within the acceptable range. The method comprises the steps of: conveying the file of articles on a first conveyor having a portion thereof in side-by-side relation with a portion of a second conveyor; inspecting and identifying each article as being acceptable or unacceptable; and acting on each acceptable article to remove it from the first conveyor to the second conveyor. In this manner, the unacceptable articles remain on the first conveyor and form a first sub-file which is forwarded on the first conveyor, and the acceptable articles form a second sub-file which is forwarded on the second conveyor.

The method, of the present invention, of segregating articles may further include tipping every article to a stable predetermined first orientation so that the entire file is conveyed on the first conveyor for a part of the length of the side-by-side portions of the two conveyors, and then acting to tilt the acceptable articles to a stable, predetermined second orientation so that the acceptable articles lose contact with the first conveyor and become disposed on the second conveyor. Thus, the first sub-file consists of the unacceptable articles disposed at the tipped first orientation whereas the second sub-file consists of acceptable articles disposed at the tilted second orientation.

BRIEF DESCRIPTION OF THE DRAWINGS

While the specification concludes with claims particularly pointing out and distinctly claiming the subject matter regarded as forming the present invention, it is believed the invention will be better understood from the following description of an apparatus with which the present invention may be practiced, which description is taken in connection with the accompanying drawings in which:

FIG. 1 is a fragmentary plan view of an apparatus for segregating articles by the method of the present invention.

FIGS. 2 and 3 are fragmentary transverse sectional views of the articles segregating apparatus shown in FIG. 1 taken along lines 2—2 and 3—3 thereof respectively.

FIG. 4 is an enlarged scale, end view of the camming block of the article segregating apparatus shown in FIG. 3.

FIG. 5 is a side elevational view of the camming block shown in FIG. 4 taken along line 4—4 thereof.

FIG. 6 is an enlarged scale, transverse sectional view of the cable track shown in FIGS. 2 and 3 having side-by-side portions of two conveyor cables disposed in an upwardly facing channel.

DESCRIPTION OF THE PREFERRED EMBODIMENT

Referring now to the drawiings, and particularly to FIGS. 1 through 3, an apparatus with which the present invention can be practiced is identified as article segregating apparatus or segregator 20. Segregator 20, FIG. 1, comprises a cable-type first conveyor 21, a cable-type second conveyor 22, a first side guide comprising upper rail 23 and lower rail 24, a second side guide comprising top rail 25 and bottom rail 26, infeed means 27 comprising starwheel 28 and platform 29, article tipping means 30, controllable article tilting means 31, guide means 32 for guiding articles disposed at the tilted orientation along the second conveyor 22 and for guiding articles disposed at a tipped orientation along the first conveyor 21, and frame 33, 33a, 33b and 33c, FIGS. 2, 3.

Briefly, in segregator 20, a file of articles such as tubular cans 35 (cans 33a through 33m and subsequent cans) is received on side-by-side portions of two cable-type conveyors 21, 22. Appropriately cam-configured side guides or rails cause each conveyed can to be tipped so that it leans against and slides along upper rail 23 and is propelled by only cable 40 of the first conveyor 21. Then, selected acceptable cans are tilted while being conveyed so that they lean against and slide along top rail 25 and are propelled by only cable 41 of the second conveyor 22. When the conveyed cans 35 reach a point of divergence 50 of the conveyors 21, 22, guide means 32 including extended portions of rails 23 through 26 insure that the unacceptable cans disposed at the tipped orientation are forwarded along the path of the first conveyor 21 and the selected, tilted acceptable cans disposed at tilted orientation are forwarded along the path of the second conveyor 22.

First conveyor 21, FIG. 1, and second conveyor 22 are of the cable-type and comprise a first endless cable 40 and a second endless cable 41 respectively. The conveyors 21, 22 further comprise cable tracks 42, 43, FIGS. 2 and 3, and suitable grooved sheaves (not shown) and drive means (not shown) for synchronously driving the two endless cables 40, 41 at substantially the same velocity. Grooved sheaves and means for driving the endless cables 40, 41 are not shown in the figures in order to promote clearly describing the details of the present invention and because the application of such drive means and grooved sheaves is considered within the capabilities of persons having ordinary skill in the relevant arts.

Conveyors 21, 22 are so configured that conveyor 21 provides a first path for forwarding articles and conveyor 22 provides a second path for forwarding articles which paths have side-by-side portions disposed immediately upstream from divergent portions.

The upper cable track 42, FIGS. 2, 3, and 6, has an upwardly facing channel 45 formed in it for loosely accommodating cables 40, 41 in side-by-side relation throughout the length of the side-by-side portions of conveyors 21 and 22. Channel 45, FIG. 6, has a depth which is less than the diameter of cables 40, 41, so that cables extend upwardly a distance H above the uppermost reaches of track 42. Track 42 is provided with beveled sides 46, 47 so that upwardly and outwardly facing portions of cables 40, 41 may propel containers disposed thereabove whether the articles are upright or leaning as much as A degrees to either side of vertically upright. Cable tracks 42, 43 of segregator 20 are made of high molecular weight polyethylene and cables 40, 41 are nylon sheathed aircraft cables in order to provide a sufficiently low coefficient of friction between the tracks and the cables 40, 41 to enable operation thereof at moderate speeds, i.e., at least as high as 150 feet per minute, without lubrication. Materials other than high molecular weight polyethylene, for example teflon and polypropylene, may be used to fabricate cable tracks 42, 43, and cables 40, 41 may have other than nylon exteriors, for example polyethylene and polypropylene, to result in a coefficient of friction between the cables and the cable tracks sufficiently low to permit operation without lubrication. Alternatively, and particularly for high speeds, lubricated tracks can be used. An example of a lubricated track for conveyor cable is disclosed in U.S. Pat. No. 3,507,380 - Sarovich et al., referenced hereinbefore.

At the point of divergence 50 of conveyors 21, 22, the width of channel 45 in the cable track 42 is reduced to a width sufficient to loosely accommodate only one of the endless cables in each branch of the track. Also, the radially inwardly side wall of each branch of channel 45 may be concave in order to guide and restrain the cables 40, 41 through the turns so that the cables do not jump out of their respective channels.

Although segregator 20, as shown and described, comprises driven conveyors, other types of conveyors are also suitable for practicing the present invention. For instance, inclined roller conveyors are suitable for segregating parallelopipedal shape articles according to the present invention.

The infeed means 27 of segregator 20 comprises starwheel 28 which may be driven, or may be freely rotatable on vertically extending shaft 55 so that it is driven by a surge of cans on an upstream conveyor. Starwheel 28 may also be provided with a controllable brake, not shown in the figures, in order to prevent infeed at such times as infeed may be undesirable. Such times may include but not be limited to the periods when the downstream conveyors are congested, or blocked. Because flow regulating infeed means and apparatus disposed upstream therefrom are not believed to constitute portions of the present invention, the infeed means 27 is shown in fragmentary form, FIG. 1, and the upstream equipment is not shown at all.

Assuming that a supply of articles 35 to be segregated is, however, provided to infeed means 27, an article 35 will be forwarded by each cusp 56 disposed circumferentially about the periphery of starwheel 28 as the starwheel is rotated clockwise as indicated by arrow 57. As the articles are forwarded about the periphery of starwheel 28, they are guided by extended portions of rails 23 through 26 as they slide along platform 29 and are delivered in spaced relation onto the upwardly facing surfaces of the side-by-side portions of driven cables 40, 41. They are then guided and forwarded downstream in spaced relation, towards the point of divergence 50 of conveyors 21 and 22. Although such inter-article spacing is not believed to be imperative to the present invention, such spacing does not enable segregator 20 to segregate, on an article-by-article basis, more conveniently than if the articles were in abutting relation.

Referring now to FIG. 2, guide rails 23 through 26 are so disposed that articles such as tubular cans 35a through 35m delivered to the upstream end of the side-by-side portions of cables 40, 41 will be disposed in an upright orientation with their horizontally extending bottoms resting on the upwardly facing surfaces of cables 40, 41. As shown in FIG. 1, rails 23 through 26 are so configured that they cause each can, as it is being conveyed downstream, to tip far enough as indicated by can 35f so that it leans against and slides along top rail 23, is propelled by only the first endless cable 40, and loses contact with the second endless cable 41. Article 35g, FIG. 1, is shown to be partially tipped whereas articles 35f and 35e are tipped far enough to be disposed at a stable tipped orientation; that is, their centers of gravity are so disposed that the cans will not resume their upright orientation unless acted on by an external force. Whereas rails 23 through 26 of segregator 20, as shown and described, are stationary, non-moving members of segregator 20, movable guide members such as rollers, or appropriately disposed and configured endless belts or cables may be incorporated in segregator 20 to enable segregation of articles which cannot be conveniently conveyed in sliding relation with a stationary rail.

Referring now to FIG. 3, the can indicated by the dash lines is shown in a stable, tipped first orientation, whereas can 35d is shown in a stable tilted second orientation so that it leans against and slides along upper rail 25 and is in contact with only second cable 41. The means for changing the orientation of cans 35 from the tipped orientation to the tilted orientation is the controllable article tilting means 31 which comprises camming block 60, actuator 61 and solenoid valve 62, and suitable means for providing extend-retract control signals to the solenoid valve 62.

Camming block 60 is shown in enlarged scale in FIG. 4, end view, and in FIG. 5, side elevational view. It is configured so that its upwardly facing surface 62 is a rolling, inclined plane which, when camming block 60 is retracted, is fully below the path of cans which are uniformly disposed at a tipped first orientation being conveyed along the side-by-side portions of conveyors 21, 22, and, when extended, camming block 60 is so disposed that it causes a can 35 conveyed thereacross to be gently tilted transverse the conveyors to the orientation indicated by article 35d, FIG. 3. Thus, the shape and movement of camming block 60 can be optimized to act uniformly on acceptable articles having substantially uniform dynamic response characteristics rather than having to act on unacceptable articles having dynamic response characteristics outside an acceptable range.

Camming block 60, FIG. 2, is movable between an UP position (solid lines) and a DOWN position (dotted lines). The elevational position of camming block 60 may be controlled by a variety of means, three such means being indicated in FIG. 1. Electrical power may be supplied to energize solenoid valve 62 through switch 71, or through the series arrangement of switch 72 and timer 73 or a synchronized control signal may be applied to solenoid valve 62 via wire 66 through the use of an inspection means 74 such as a checkweigher or means for determining dynamic response characteristics, and signal synchronizer 75. Thus, through operation of switch 71, the position of camming block 60 can be controlled by an operator at will to selectively segregate cans between conveyors 21 and 22. Alternatively, cans can be segregated between conveyors 21 and 22: on a time share basis through the use of switch 72 and a ratio timer 73; or the cans can be segregated automatically according to weight, height, or other measurable or visible predetermined parameters such as their dynamic response characteristics through the use of an appropriate inspection means 74 disposed upstream from the camming block 60 and synchronizer 75 which synchronizer may comprise a photo-electrically triggered shift register.

Through the use of automatic means for controlling the elevational position of camming block 60, an incoming file of articles can be divided into "good" and "bad" sub-files of articles comprising acceptably uniform articles, and unacceptably non-uniform articles respectively on the basis of predetermined parametric criteria such as dynamic response characteristics, weight, size, overfill or underfill, and other such criteria.

Guide means 32, FIG. 1, including extended portions of rails 23 through 26, are configured and disposed as indicated in FIG. 1 to insure that unacceptable articles disposed at a tipped orientation which are being propelled by cable 40 of first conveyor 21 and which are leaning against and sliding along upper rail 23 will follow the upper branch of the conveyor from juncture 50 and thence follow the path of the first conveyor 21, and guide means 32 are so configured and disposed that acceptable articles having the tilted orientation (as indicated by article 35d) which are being propelled by cable 41 of second conveyor 22 and which are leaning against and sliding along top rail 25 will follow the lower branch of the conveyor from juncture 50 and thence follow the path of the second conveyor 22.

While the present invention has been described through the use of a preferred embodiment segregator 20 and alternate segregator embodiments, it would be obvious to those skilled in the art that various changes can be made without departing from the spirit and scope of the invention. It is intended to cover in the apended claims all such variations that are within the scope of this invention.

What is claimed is:

1. A method of segregating a conveyed file of articles into a first sub-file consisting of unacceptable said articles having dynamic response characteristics outside an acceptable range, and a second sub-file consisting of acceptable articles having dynamic response characteristics within the acceptable range, said method comprising the steps of:

conveying said file of articles on a first conveyor having a portion thereof in side-by-side relation with a portion of a second conveyor;

inspecting and identifying each article as being acceptable or unacceptable;

tipping every article of said file to a stable predetermined first orientation so that the entire file is conveyed on said first conveyor for a part of the length of said side-by-side portions of said conveyors; and, acting on each acceptable article to remove each acceptable article from said first conveyor to said second conveyor, said acting comprising tilting said acceptable articles to a stable predetermined second orientation by interposing a cam in the path of said file of articles disposed at said first orientation, said tilting causing said acceptable articles to lose contact with said first conveyor and to become disposed on said second conveyor, whereby the unacceptable articles remaining on said first conveyor form said first sub-file which is thence forwarded on said first conveyor, and said acceptable articles form said second sub-file which is thence forwarded on said conveyor, said first sub-file consisting of said unacceptable articles disposed at said first orientation, and said second sub-file consisting of said acceptable articles disposed at said second orientation.

2. The method of segregating a conveyed file of articles of claim 1 wherein said tipping is substantially transverse said first conveyor, and said tilting is substantially opposite from said tipping and is substantially transverse said side-by-side portions of said conveyors.

* * * * *

UNITED STATES PATENT OFFICE
CERTIFICATE OF CORRECTION

Patent No. 3,856,665   Dated   December 24, 1974

Inventor(s)   Stanley D. Wahlert

It is certified that error appears in the above-identified patent and that said Letters Patent are hereby corrected as shown below:

Column 3, line 22, "articles" should be... article...;

Column 3, line 37, "drawiings" should be... drawings...;

Column 4, line 28, add the word "the" before... cables extend upwardly a distance H above the upper-...; and Column 5, line 27, omit the word "not" before... enable segre-...

Signed and sealed this 4th day of March 1975.

(SEAL)
Attest:

RUTH C. MASON
Attesting Officer

C. MARSHALL DANN
Commissioner of Patents
and Trademarks